United States Patent [19]
Wadell

[11] Patent Number: 5,405,059
[45] Date of Patent: Apr. 11, 1995

[54] ROTARY FILLING APPARATUS

[75] Inventor: Lars G. A. Wadell, Aengelholm, Sweden

[73] Assignee: Nestec S.A., Vevey, Sweden

[21] Appl. No.: 147,058

[22] Filed: Nov. 3, 1993

[30] Foreign Application Priority Data

Nov. 21, 1992 [EP] European Pat. Off. ............ 92119847

[51] Int. Cl.⁶ .................... B65B 3/30; G01F 25/00; G01F 11/20
[52] U.S. Cl. .................... 222/306; 222/152; 222/368; 222/636; 141/65; 141/67; 141/83; 141/144
[58] Field of Search ............ 141/1, 65, 67, 83, 95, 141/139, 153, 177, 144; 222/306, 368, 636, 305, 152

[56] References Cited

U.S. PATENT DOCUMENTS

| | | | |
|---|---|---|---|
| 2,399,472 | 4/1946 | de la Roza | 222/368 |
| 2,538,320 | 1/1951 | Mylting | 222/368 |
| 3,446,404 | 5/1969 | Mehta | 222/306 X |
| 3,648,741 | 3/1972 | Croasdale et al. | 141/83 X |
| 3,656,518 | 4/1972 | Aronson | 141/67 X |
| 4,060,109 | 11/1977 | Sotoma | 141/83 |
| 4,065,032 | 12/1977 | Lydiksen | 141/83 X |
| 4,651,788 | 3/1987 | Kreuz et al. | 141/83 |
| 4,676,286 | 6/1987 | Aivola et al. | 141/145 |
| 4,991,632 | 2/1991 | Nordmeyer et al. | 141/1 |
| 5,082,032 | 1/1992 | Crocker | 141/1 |

FOREIGN PATENT DOCUMENTS

| | | |
|---|---|---|
| 0124345 | 11/1984 | European Pat. Off. . |
| 2461650 | 2/1981 | France . |
| 1698037 | 9/1971 | Germany . |
| 3120017 | 3/1982 | Germany . |
| 3510110 | 10/1986 | Germany . |
| 4033582 | 4/1992 | Germany . |
| 2024158A | 1/1980 | United Kingdom . |

OTHER PUBLICATIONS

Giraud, et al., French Patent No. 2 461 650 (1981) DIALOG Data Base Abstract No. 003039574.
Farnett, German Patent No. 3120017A1 (1982) DIALOG Data Base Abstract No. 003277497.
Rieger, German Patent No. 3510110A1 (1986) DIALOG Data Base Abstract No. 004762330.
Hamm, German Patent No. 40 33 582 A1 (1992) DIALOG Data Base Abstract No. 009014907.

*Primary Examiner*—J. Casimer Jacyna
*Attorney, Agent, or Firm*—Vogt & O'Donnell

[57] ABSTRACT

A rotary filling apparatus includes a rotatable drum body having an apex and a base, an outer circumferential wall which defines a drum periphery, and lateral walls which extend from the drum periphery into the drum body to define a plurality of spaced drum chambers. The lateral walls have aligned keyhole slots, positioned away from the drum periphery, and a vessel is slidably positioned in each drum chamber. A key, having a longitudinal axis and a cross-sectional area which increases from a base portion to a head portion, is positioned in the keyhole slots, so that upon longitudinal displacement of the key the vessel is caused to ascend or descend in the chamber, thereby decreasing or increasing the volume of the chamber. A cover plate is positioned adjacent the drum periphery, between the drum apex and base, for retaining material in drum chambers during rotation of the drum.

10 Claims, 1 Drawing Sheet

ROTARY FILLING APPARATUS

BACKGROUND OF THE INVENTION

The present invention relates to a volumetric filling machine, more particularly for solid and semi-solid or viscous products.

In existing volumetric filling machines, there is no provision for the automatic adjustment of the chamber volume. In addition, many existing volume filling machines have sharply angled volume chambers, which is not ideal for volume accuracy.

SUMMARY OF THE INVENTION

The preinvention provides a volumetric filler in which the volume of the chamber is automatically adjusted to a predetermined set volume before filling.

Accordingly, the present invention provides a volumetric filling machine comprising
a) a hopper for containing a product,
b) sensor means for recording the level of the product in the hopper,
c) at least one chamber,
d) means for conveying an empty chamber to a position beneath the hopper for filling with product,
e) means for conveying a filled chamber away from the hopper for discharging the product,
f) weighing means for recording the weight of product discharged from a filled chamber,
g) a computer adapted to receive the recorded information (b) and (f), and
h) means adapted to be activated by the computer based on the recorded information, for automatically adjusting the volume of an empty chamber before filling with the product.

DETAILED DESCRIPTION OF THE INVENTION

The sensor means for recording the level of the product in the hopper may be, for instance, one or more photocells.

The chamber advantageously comprises a vessel surrounded at its periphery by a contacting wall in which the vessel is adapted to slide longitudinally so that, at the filling position, the upper edge of the vessel lies level with or at a determined distance below the upper surface of the contacting wall. The volume of the chamber comprises the volume within the vessel and any volume above the the upper edge of the vessel bounded by and extending to upper surface of the contacting wall and the longitudinal sliding of the vessel within the contacting wall enables the volume of the chamber to be adjusted. The interior surface of the vessel is preferably smoothly curved and free from angles and the vessel is preferably semi-spherical.

Advantageously, there are a plurality of chambers e.g., from 2 to 20, which pass consecutively beneath the hopper.

The means for conveying an empty chamber to the hopper and for conveying a filled chamber away from the hopper may be an endless conveyor belt but preferably it is provided by a circular drum with a plurality of chambers, conveniently from 3 to 12, formed in the periphery. Advantageously, a fixed cover plate is positioned adjacent that part of the periphery of the drum conveying filled chambers before discharge.

When the chambers are conveyed in the periphery of a circular drum, they are preferably spaced regularly around the periphery.

Conveniently, the chambers are filled with the product when at the apex of the drum and are emptied when positioned at the base of the drum.

Conveniently, a reciprocating knife is positioned beneath the lower end of the hopper which is adapted to separate the product in a filled chamber from that in the hopper.

The weighing means for recording the weight of product discharged from a filled container may be, for instance, a check weigher.

The means adapted to be activated by the computer for automatically adjusting the volume of an empty chamber comprising a vessel surrounded at its periphery by a contacting wall may be a key whose cross sectional area increases from the base to the head, passing horizontally through one side of the contacting wall and beneath the vessel, whose position may be adjusted along its longitudinal axis to cause the vessel to ascend or descend within the wall thus causing the volume of the chamber to decrease or increase respectively. The adjustment of the position of the key may be performed by a fixed motor activated by the computer.

Vacuum means may be present to aid filling of the chamber, and pressure means such as compressed air may be used to aid the discharge of the product from the filled chamber.

The machine of the present invention may be used for filling products of suitable particle size such as vegetables, fish, meat, rice, spaghetti or french fries, etc.

The present invention also provides a process for filling a product volumetrically which comprises introducing the product into a hopper, recording the level of the product in the hopper and transmitting the recorded information to a computer, conveying an empty chamber to a position beneath the hopper, automatically adjusting the volume of the empty chamber and filling the empty chamber with the product, conveying the filled chamber away from the hopper and discharging the product, recording the weight of the discharged product and transmitting the recorded weight to the computer, the automatic adjustment of the volume of the empty chamber being based on the recorded information transmitted to the computer.

BRIEF DESCRIPTION OF THE DRAWINGS

The present invention is further illustrated, by way of example only, with reference to the accompanying drawings.

DETAILED DESCRIPTION OF THE DRAWINGS

Figure 1:
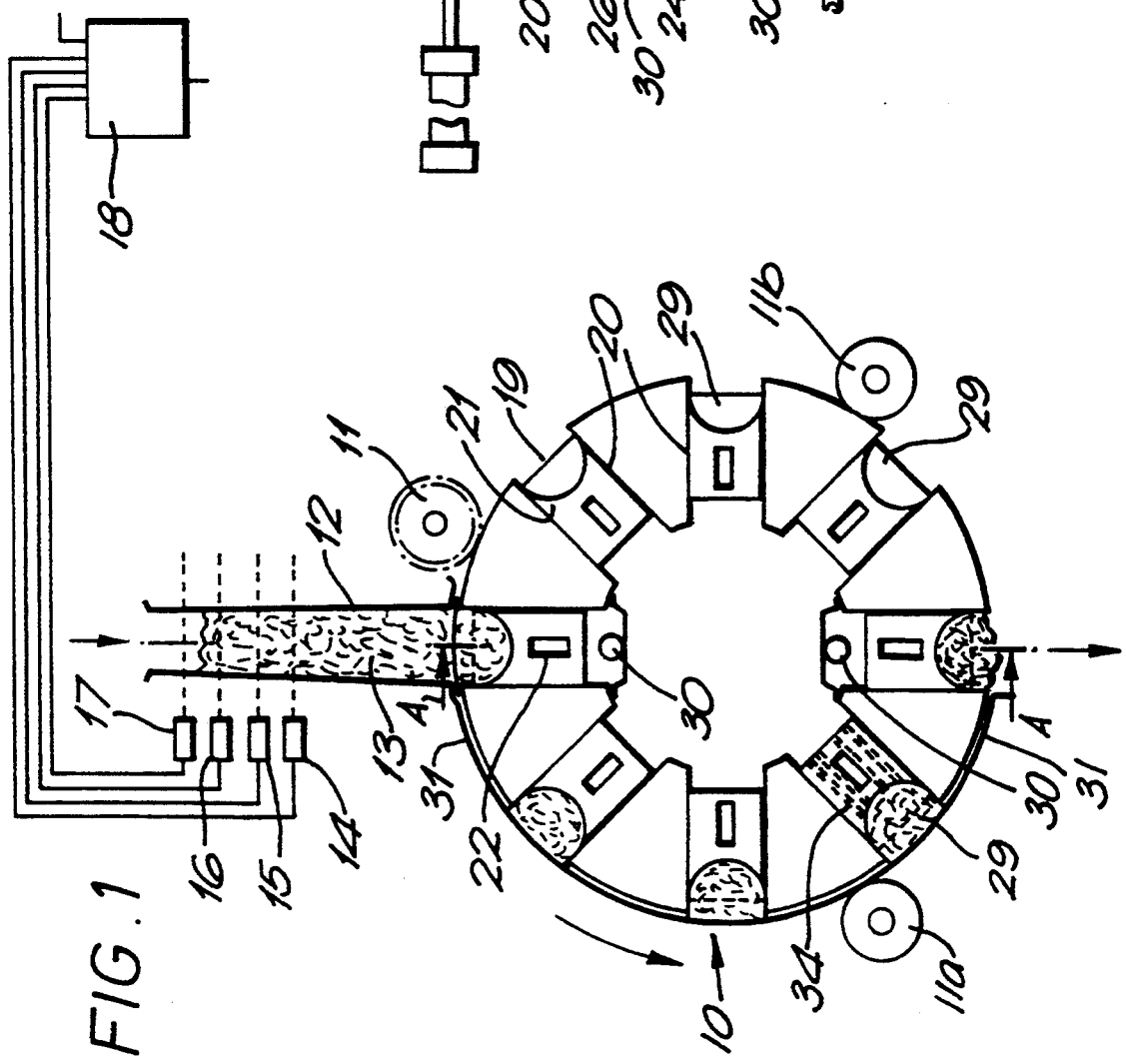
FIG. 1 represents a diagrammatic transverse section through a filling machine.

Referring to the drawings, the filling machine comprises a circular drum, generally designated 10, adapted to revolve in the direction of the arrow in FIG. 1. The drum 10 is driven by means of motor (not shown) driving a cog wheel 11 and guided by rollers 11a, 11b, positioned beneath a hopper 12 containing potato pieces 13.

Figure 2:
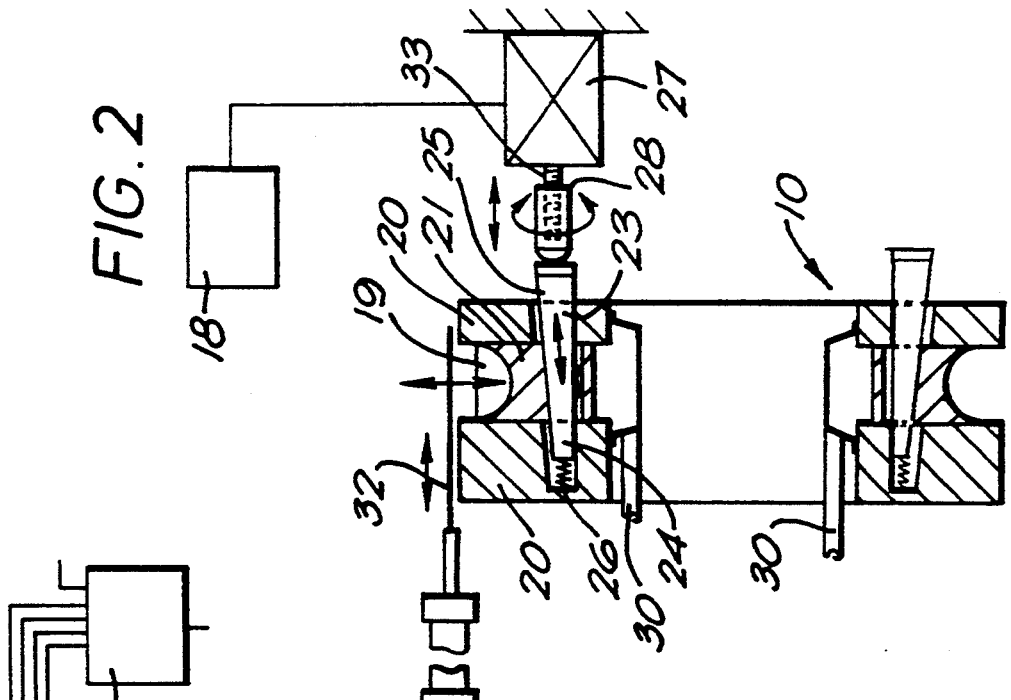
FIG. 2 represents a sectional view along the line 1—1 in FIG. 1.

Photocells 14, 15, 16, 17 record the level of the potato pieces in the hopper, and a computer 18 is adapted to receive this recorded information. In the periphery of the circular drum 10 are eight cylindrical openings 19 surrounded by walls 20, the axes of which are separated by an angle of 45°. Slidably mounted within each cylindrical opening 19 is a semi-spherical vessel 21. Below the base of each semi-spherical vessel, a slot 22 is present in the wall 20 extending between the lateral walls of the drum 10, and within each slot 22 is an adjustable key 23, whose cross-sectional area increases from its base 24 to its head 25, secured to one of the lateral walls of the drum by means of an extension spring 26. A fixed pulse motor 27 (FIG. 2) positioned adjacent the apex of the drum controls a reciprocating pusher 28 by means of a rotating screw 33, the pusher 28 being adapted to push the head 25 of the adjustable key 23 into the appropriate position. The volume of the semi-spherical vessel, bounded by and extending to the upper surface of the wall 20, constitutes the chamber 29. Pipe means 30 are present for generating a vacuum or pressure to aid in filling or discharging respectively the chambers 29. A cover plate 31 is provided around that part of the periphery of the drum carrying the filled chambers 29. Between the hopper and the chamber at the apex of the drum is a reciprocating knife 32. Drainage holes 34 are present in the wall 20 to admit compressed air or vacuum conditions into the chamber 29 via pipe 30.

In operation, potato pieces 13 are fed to the hopper 12, and the level in the hopper is recorded by the photocells 14, 15, 16, 17, this information being used to adjust the preset volume in the chamber 29 and being fed to the computer 18 which is programmed for a predetermined weight. The drum 10 is caused to rotate by a motor (not shown) and the cog wheel 11 until a chamber 29 is positioned immediately below the hopper 12, the lower end of which is closed by the knife 32, whereupon the drum stops. The motor 27 causes the pusher 28, by means of the rotating screw 33 to press the adjustable key 23 the appropriate distance to the left in FIG. 2 to cause the vessel 21 to ascend within the wall 20 until the chamber 29, has the required volume. The reciprocating knife 32 retracts and potato pieces 13 fall into the chamber 29 aided by the vacuum generated through the drainage holes 34 and the pipe 30 until it is full, whereupon the reciprocating knife 32 advances to cut off the product within the filled chamber. The drum restarts and the filled chamber travels with the rotating drum 10 covered by the cover plate 31 until it reaches the base of the drum just beyond the termination of the cover plate where the drum stops, and the potato pieces 13 are discharged into a container on a conveyor by gravity aided by compressed air flowing through the pipe 30 into the chamber 29 via the drainage holes 34. The weight of the potato pieces discharged is recorded by a check weigher (not shown) which is positioned after the filling machine on the conveyor transporting the filled containers, and the information is fed to the computer 18. The weight recorded by the check weigher indicates whether the filling has been correct. Too high a weight indicates that the chamber volume should be decreased, and vice versa.

The hopper is fed with more potato pieces and, based on the information received from the photocells 14, 15, 16, 17 and the weight of the discharged potato pieces, the computer activates the motor 27 to cause the pusher 28 to adjust the position of the key 23 to the right or the left so that the volume of the chamber 29 positioned beneath the hopper 12 is adjusted to the desired value. After being filled with potato pieces, the filled chamber moves away from the hopper, and the next empty chamber is conveyed to a position beneath the hopper where the process is repeated.

The discharged potato pieces are fed into containers travelling below the circular drum on a conveyor belt. The drum may rotate at a speed sufficient to enable the filling of up to 80 cups/minute.

I claim:

1. A rotary filling apparatus comprising:
    a rotatable drum body having an apex and a base, an outer circumferential wall which defines a drum periphery, and lateral walls which extend from the drum periphery into the drum body to define a plurality of spaced drum chambers, the lateral walls having aligned keyhole slots therein, positioned away from the drum periphery;
    a vessel, slidably positioned in each chamber, which extends from a base portion adjacent the keyhole slots to a head portion adjacent the drum periphery;
    a key, positioned in each keyhole slot, having a longitudinal axis and a cross-sectional area which increases from a base portion to a head portion, so that upon longitudinal displacement of the key in the keyhole slot the vessel is caused to ascend or descend in the chamber, thereby decreasing or increasing the volume of the chamber; and
    a cover plate, positioned adjacent the drum periphery, between the drum apex and base, for retaining product in drum chambers during rotation of the drum.

2. An apparatus according to claim 1 further comprising an extension spring, connected to each key, for securing the key to a lateral drum wall.

3. An apparatus according to claim 1 further comprising a rotating screw positioned for displacing a key in its longitudinal axis in the keyhole slots.

4. An apparatus according to claim 1 further comprising a hopper positioned for delivering product to a drum chamber.

5. An apparatus according to claim 4 further comprising a reciprocating knife positioned between the hopper and the drum for separating product in a chamber from the hopper.

6. An apparatus according to claim 1 further comprising a vacuum pipe connected to each chamber.

7. An apparatus according to claim 1 wherein the chambers are spaced regularly about the drum periphery.

8. An apparatus according to claim 1 wherein the drum comprises from 3 to 12 chambers.

9. An apparatus according to claim 1 wherein the axes of the lateral walls defining the drum chambers are separated, respectively, by an angle of 45°.

10. An apparatus according to claim 1 wherein the head portion of each vessel is semi-spherical in shape.

* * * * *

UNITED STATES PATENT AND TRADEMARK OFFICE
CERTIFICATE OF CORRECTION

PATENT NO. : 5,405,059

DATED : April 11, 1995

INVENTOR(S) : Lars G.A. WADELL

It is certified that error appears in the above-indentified patent and that said Letters Patent is hereby corrected as shown below:

On the title page in the [73] Assignee heading, delete "Sweden" and insert therefor --Switzerland--.

Signed and Sealed this

Eleventh Day of July, 1995

Attest:

BRUCE LEHMAN

Attesting Officer

Commissioner of Patents and Trademarks